June 4, 1940.  W. B. BARRY  2,203,124
INNER TUBE FOR AUTOMOBILE TIRES
Filed Dec. 27, 1938  2 Sheets-Sheet 1

INVENTOR,
WILLIAM B. BARRY.
BY Lippincott & Metcalf
ATTORNEYS.

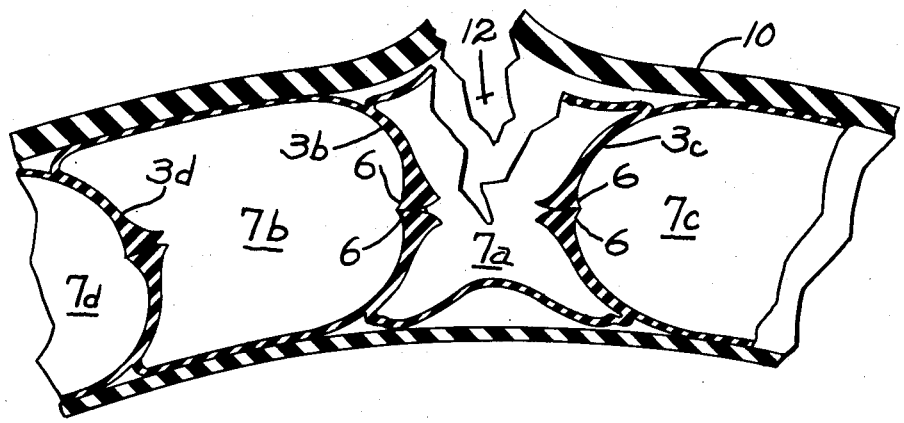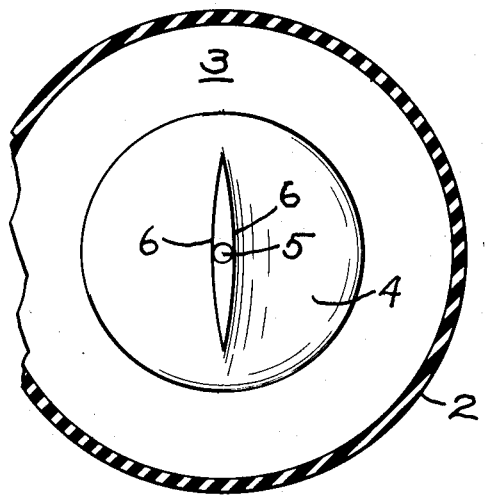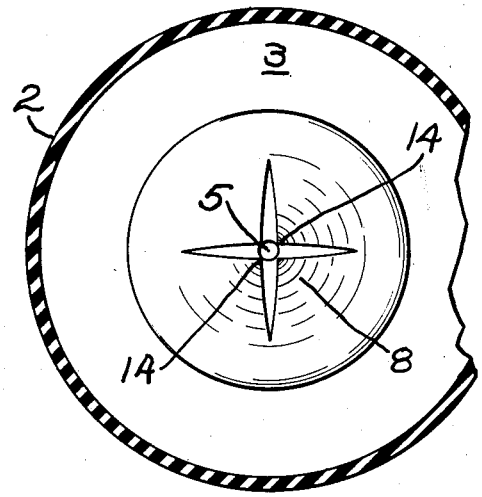

Patented June 4, 1940

2,203,124

UNITED STATES PATENT OFFICE 2,203,124

INNER TUBE FOR AUTOMOBILE TIRES

William B. Barry, San Francisco, Calif.

Application December 27, 1938, Serial No. 247,759

6 Claims. (Cl. 152—338)

My invention relates to inner tubes carrying air pressure inside pneumatic tires, such as are used on vehicles, and the primary object of my invention is to provide a tube of this character which will prevent or delay the release of all the air in the tube when a blowout or similar sudden release of air occurs, thereby greatly promoting safety of vehicle and driver.

Among the objects of my invention are: To provide an inner tube provided with separate compartments, together with simple means to prevent rapid interchange of air between compartments; to provide a sectionalized inner tube, together with a new and unique air control valve between sections; to provide a sectionalized inner tube with sections separated by double strength diaphragms; to provide a sectionalized inner tube having diaphragms forming the sections, sufficiently strong to carry the full difference of pressure between atmosphere and the inside air after a blowout; to provide a sectionalized inner tube having non-metallic valves between sections; and to provide a simple and effective inner tube of exceptional safety.

Other objects of my invention will be apparent or will be specifically pointed out in the description forming a part of this specification, but I do not limit myself to the embodiment of the invention herein described, as various forms may be adopted within the scope of the claims.

Referring to the drawings:

Fig. 7 is a sectionalized diagram illustrating the action of the diaphragms upon sudden release of air from a section.

Fig. 8 is a view partly in section and partly in elevation, looking toward a double lip valve.

Fig. 9 is a view partly in section and partly in elevation, looking toward a four lip valve.

Referring directly to the drawings for a more detailed description of my invention, I utilize as a base for my improved inner tube a stretchable fabric 1 having a maximum expansion limit. Such fabrics are well known in the art and need not be described here by reference to any individual weave.

Figure 1:
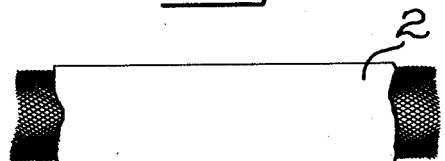
Fig. 1 is a view in elevation of a preferred type of inner tube before formation into sections. Portions of the rubber have been cut away to show the fabric body.
Figure 2:
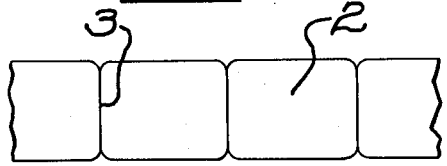
Fig. 2 is a diagram showing the exterior of the tube after vulcanization.

A rubber covering 2 is applied to inside and outside faces of the fabric, and the composite tube thus formed is telescoped upon itself, as shown in Fig. 2, to form diaphragms 3 dividing the tube into individual sections, the ends of the tube are joined, and the entire tube vulcanized into a ring. In this way diaphragms 3 are formed of bonded double thicknesses of both rubber and fabric, and thus the diaphragms are stronger than the remainder of the tube. The reason for this extra strength will be brought out later.

When the reentrant diaphragms 3 are made by telescoping the tube, and before vulcanization, in certain embodiments of my invention a plurality of soft rubber valve structures 4 are inserted and joined to each reentrant diaphragm 3, so that after vulcanization of the tube each diaphragm is provided with such a valve. The valve itself is provided with a central aperture 5, and in the modification shown in Figs. 3 and 8, two lips 6 are provided, one on each side of the central aperture, extending outwardly into the adjacent compartments 7. The central aperture 5 provides a convenient means for supporting the valves on a mandrel or similar device during insertion.

Figure 4:
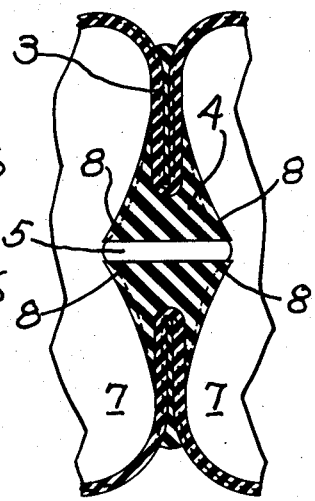
Fig. 4 is a sectional view of another form of valve.

In another modification of my invention shown in Figs. 4 and 9, four quadrant lips 8 are provided, also extending outwardly and terminating around the theoretical extension of the aperture surface.

Figure 5:
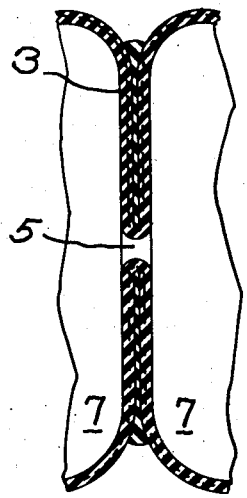
Fig. 5 is a sectional view of a double strength diaphragm utilized without a valve.
Figure 6:
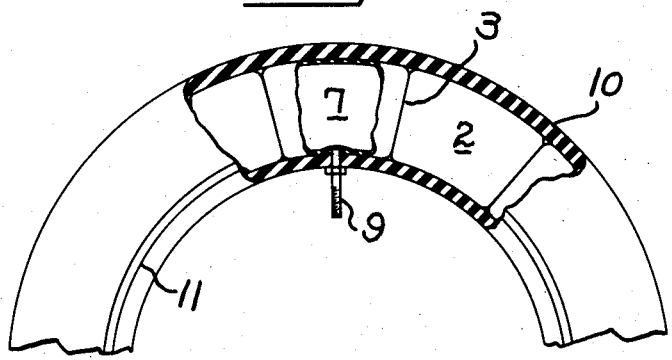
Fig. 6 is a view partly in elevation and partly in section, portions of the casing being cut away, of the tube of my invention installed in a tire.

In the modification shown in Fig. 5 I utilize no special valve, but force the reentrant diaphragm portions 3 further toward the center of the tube to provide a smaller compartment-connecting aperture 5.

As is customary in all inner tubes, the inner tube is provided with an air valve 9, and when a casing 10 is mounted on a wheel rim 11 the inner tube will be positioned within the casing, with the diaphragms in substantially radial planes and uncurved. Air is then slowly admitted into the inner tube through air valve 9, and the air will pass from compartment to compartment through apertures 5, thus pumping up the tire.

In case a blowout occurs, which has been shown diagrammatically in Fig. 7, a blowout opening 12 in casing 10 will cause rupture of the compartment 7a immediately below the blowout opening 12, and the air will escape from this compartment rapidly. The high air pressure in adjacent compartments 7b and 7c thereupon exerts pressure against adjacent diaphragms 3b and 3c, causing them to assume an outward curvature. When diaphragms 3b and 3c curve, however, the soft lips 6 of the double lip valve come in contact with each other on the inside of chambers 7b and 7c and effectively prevent any substantial release of air from these compartments. Furthermore, the next adjacent diaphragms, such as diaphragm 3d, for example, in Fig. 7, may also assume a curvature and seal compartment 7b from the next adjacent compartment 7d. Thus, the curvature of the diaphragms adjacent compartment 7a causes a sealing of the remainder of the air in the tube from the atmosphere.

Obviously, the spacing of the lips around the central apertures 5 may be varied so that a predetermined curvature has to be attained before sealing occurs. Thus, in inflating the tube of my invention, small curvatures may take place without sealing the compartments. It will be noticed, however, that when a single compartment 7a ruptures and allows the escape of air, that the pressure in adjacent compartments 7b and 7c is concentrated on the diaphragms exposed to atmospheric pressure. It is for this reason that I have made my diaphragms of double thickness so that when the side walls of the inner tube are forced against the casing, the greater portion of the air pressure is taken by the diaphragms which, being of double strength, will not again blow out. If this precaution is not taken I have found that there is danger of diaphragm blowout, because these diaphragms have no support from the casing.

Figure 3:
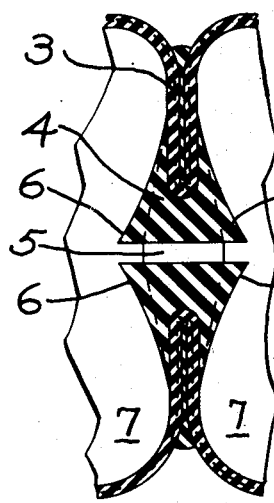
Fig. 3 is a sectional view showing one form of soft rubber valve forming a portion of the separating diaphragms.

The valve shown in Figs. 4 and 9, namely, the quadrant type having the four quadrant lips, operates in exactly the same manner as the two lip valves shown in Figs. 3 and 8. In the four lip type, the points 14 of the quadrants are forced together due to any substantial curvature of the diaphragm, thus sealing off aperture 5. Obviously, other numbers of lips can be used if desired.

In the modification shown in Fig. 5, I have not attempted to completely seal the adjacent diaphragms from the compartment that ruptures, but I have merely provided a small aperture 5 which allows the air to escape only slowly, thus allowing a driver to control his vehicle before the air pressure is completely exhausted, and it is in this modification that I take full benefit of the doubling of the fabric to reenforce diaphragms 3, thus preventing the diaphragms open to the atmosphere from rupturing, due to the fact that at that time they have to carry the full air pressure against the atmosphere.

It is to be noted that my invention uses neither metal valves nor metal parts in the valves, and consequently the tube and casing are not subject to immediate ruin if for any cause the vehicle is operated with a deflated tube.

I claim:

1. In a pneumatic tire inner tube having a body portion and a plurality of diaphragms dividing said tube into separate compartments, a valve inserted in each of said diaphragms, said valve being wholly formed of flexible material and having a central aperture therein connecting the compartments separated by the diaphragm on which said valve is mounted, opposed flexible lips around each end of said aperture and extending into said compartments, the opposed lips being spaced apart to provide free air passages through said aperture when the diaphragm on which the valve is mounted is maintained substantially planar by equal air pressure on both sides thereof, and movable into contact thereby closing said aperture when the side of the diaphragm carrying said lips assumes a concave shape due to reduction in pressure of one of said compartments.

2. Apparatus in accordance with claim 1, wherein said inner tube is formed from rubber impregnated in a stretchable fabric having an upper stretch limit, and wherein each of said diaphragms is formed of attached reentrant portions centrally attached to one of said flexible valves, thereby providing double fabric strength in said diaphragms to resist differential pressures between compartments.

3. Apparatus as recited in claim 1, wherein each of said flexible valves is formed from soft rubber vulcanized to said diaphragm.

4. Apparatus as recited in claim 1, wherein each of said flexible valves is formed from soft rubber vulcanized to said diaphragm, and wherein said opposed lip portions are lips formed integrally with said valve.

5. Apparatus as recited in claim 1, wherein each of said flexible valves is formed from soft rubber vulcanized to the diaphragm on which it is mounted, and wherein said opposed lip portions are four outwardly extending integral lips having maximum outward extensions adjacent the ends of said aperture.

6. A distortion operated valve for a diaphragm separating two compartments having air pressure therein, comprising a valve body wholly formed of flexible material, inserted in said diaphragm, said valve having a central aperture therein connecting said compartments, opposed flexible lips around each end of said aperture and extending into said compartments, the opposed lips being spaced apart to provide free air passages through said aperture when said diaphragm is maintained substantially planar by equal air pressure on both sides thereof, and movable into contact thereby closing said aperture when the side of the diaphragm carrying said lips assumes a concave shape due to reduction in pressure in one of said compartments.

WILLIAM B. BARRY.